(12) United States Patent
Gorst et al.

(10) Patent No.: US 8,159,810 B1
(45) Date of Patent: Apr. 17, 2012

(54) SYSTEM FOR PROVIDING SELECTIVE CAPACITANCE TO A SINGLE PHASE MOTOR WITH A BUNDLED CAPACITOR

(75) Inventors: Malcolm Gorst, Newton Abbot (GB); Ronald E. Loving, Reno, NV (US)

(73) Assignee: Direct Brand, Ltd., New Abbot (GB)

( * ) Notice: Subject to any disclaimer, the term of this patent is extended or adjusted under 35 U.S.C. 154(b) by 283 days.

(21) Appl. No.: 12/701,352

(22) Filed: Feb. 5, 2010

Related U.S. Application Data (60) Provisional application No. 61/156,661, filed on Mar. 2, 2009, provisional application No. 61/156,713, filed on Mar. 2, 2009, provisional application No. 61/156,727, filed on Mar. 2, 2009.

(51) Int. Cl.
*H01G 4/32* (2006.01)
(52) U.S. Cl. ............... 361/301.5; 361/301.1; 361/301.3; 361/502; 361/504; 361/328
(58) Field of Classification Search ............... 361/301.5, 361/301.1, 301.3, 502, 503–504, 509–512, 361/516–519, 523–529, 328–330
See application file for complete search history.

(56) References Cited

U.S. PATENT DOCUMENTS

| | | | |
|---|---|---|---|
| 3,842,325 A | 10/1974 | Callins et al. | |
| 4,408,818 A | 10/1983 | Markarian | |
| 4,447,854 A | 5/1984 | Markarian | |
| 4,635,163 A | 1/1987 | Voglaire | |
| 4,788,624 A | 11/1988 | Strange | |
| 5,315,474 A | 5/1994 | Kuriyama | |
| 5,638,250 A | 6/1997 | Oravala | |
| 5,680,290 A | 10/1997 | Akai et al. | |
| 6,212,058 B1 * | 4/2001 | Huber | 361/301.5 |
| 7,046,498 B1 * | 5/2006 | Huang | 361/301.2 |
| 7,203,053 B2 | 4/2007 | Stockman | |
| 7,365,959 B1 * | 4/2008 | Ward | 361/328 |
| 7,471,498 B2 | 12/2008 | Lavene et al. | |
| 7,848,079 B1 * | 12/2010 | Gordin et al. | 361/328 |

* cited by examiner

*Primary Examiner* — Nguyen T Ha
(74) *Attorney, Agent, or Firm* — Buskop Law Group, PC; Wendy Buskop (57) ABSTRACT

A system for providing selective capacitance with a bundled capacitor is described herein. The bundled capacitor can include a housing a cap, a central common terminal, a plurality of auxiliary terminals, an interrupter, an insulating spider, a plurality of individual rolled sandwich like connected capacitors, a thermal fuse, a frangible electrical connection, an insulating layer, a resin, and an expansion chamber. A single phase motor can be connected to the bundled capacitor.

20 Claims, 11 Drawing Sheets

SYSTEM FOR PROVIDING SELECTIVE CAPACITANCE TO A SINGLE PHASE MOTOR WITH A BUNDLED CAPACITOR

CROSS REFERENCE TO RELATED APPLICATIONS

The present application claims priority and the benefit of U.S. Provisional Patent Application Ser. No. 61/156,661 filed on Mar. 2, 2009, U.S. Provisional Patent Application Ser. No. 61/156,713 filed on Mar. 2, 2009, and U.S. Provisional Patent Application Ser. No. 61/156,727 filed on Mar. 2, 2009. These references are hereby incorporated in their entirety.

FIELD

The present embodiments generally relate to a system for providing selective capacitance to a single phase motor, such as an air conditioning motor, by using a bundled capacitor made from a plurality of wound capacitors connectable to match needed capacitance for a load.

BACKGROUND

A need exists for a system for operating single phase motors that is reliable and versatile, particularly when the motors are for air conditioning systems or other devices used in hospitals and critical care facilities.

A need exists for a system that has a bundled capacitor which is versatile and has low maintenance requirements.

A need exists for a system that has a bundled capacitor made from multiple capacitors connectable together to provide a selected capacitance value, which can still operate if one of the capacitors in the bundled capacitor fails to function.

The present invention meets these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a bundled capacitor with a plurality of individual rolled sandwich like capacitors connected together.

During any given week a single service person can service many various sized air conditioning units or other devices that have single phase motors. Embodiments of the present invention can allow a single service person to provide maintenance, repair, and service to a wide variety of motors by using a single device.

A plurality of capacitors can be used in the bundled capacitor. In one or more embodiments, from about 1 capacitor to about 8 capacitors can be used in the bundled capacitor. The plurality of capacitors can be connected together through a central common terminal of the bundled capacitor.

Each capacitor can provide an individual capacitance value. For example, for a bundled capacitor with a capacitance of 30 microfarads, each individual capacitor can have a capacitance of 5 microfarads.

In one or more embodiments, the bundled capacitor can be used for single phase motors that require a capacitance from about 0.005 microfarads to about 300 microfarads. If one of the individual capacitors of the bundled capacitor fails to function, the bundled capacitor can continue to function, in-part because the bundled capacitor includes more than one individual capacitor.

The bundled capacitor can have a housing that can be made from graphite composite, reinforced polypropylene, polyethylene, aluminum, aluminum alloys, stainless steel, plated mild steel, another material, or combinations thereof. In one or more embodiments, the housing can be formed of a strong, non-brittle, and non-deformable material.

The housing can have a housing body, an interior side and an exterior side.

The housing can be cylindrical or another geometric shape as needed for the particular application. The housing can have sides and a first integral end.

In one or more embodiments, the thickness of the sides and of the first integral end of the housing can be from about 0.005 millimeters to about 2 millimeters.

In one or more embodiments, the housing can have reinforcing ribs. The reinforcing ribs can enable the housing to maintain a shape and can prevent the housing from becoming perforated, cracked, or otherwise damaged if one of the individual capacitors overheats or explodes.

In one or more embodiments, the overall length and the outer diameter of the housing can be from about 20 millimeters to about 500 millimeters.

The housing can have an indicator light and a test plug to allow a person, such as an HVAC serviceman, to test that the bundled capacitor or an individual capacitor is still functioning or to check if the selective capacitance value is still being provided. The selective capacitance value can be from about 0.005 microfarads to about 500 microfarads.

In one or more embodiments, the housing can be closed with a cap. The cap can be hermetically sealable, deformable, or combinations thereof.

The cap can have a thickness of from about 0.005 millimeters to about 500 millimeters and can have a diameter slightly larger than the housing body.

The cap can include a body and a lip. The cap body can be an expandable body.

The expandable body can provide safety to a user of the bundled capacitor. The expandable body can allow the cap to expand away from the housing body. For example, if one of the individual capacitors of the bundled capacitor overheats or explodes, the expandable body can allow the cap to expand away from the housing body while still maintaining the cap in engagement with the housing and without allowing anything to exit the housing. The cap can thereby protect a user from any debris associated with an overheating or exploding capacitor.

The cap can be attached or otherwise connected to the housing on an end of the housing body which is opposite from the first integral end.

The cap lip can be from about 0.005 millimeters to about 50 millimeters in width. In one or more embodiments, the lip can be crimped over edges of the housing body, forming a non-removable cap.

A central common terminal, also herein referred as a central common terminal, can be disposed through or on the cap. The central common terminal can be centrally disposed through the cap.

The central common terminal can include at least one blade. In one or more embodiments, the central common terminal can include from about 1 blade to about 4 blades.

The central common terminal can include a fastener, which can be a rivet, for holding the central common terminal to the cap. The fastener can be centrally disposed on the central common terminal.

The central common terminal, or a wire engaged with the central common terminal, can engage a frangible connection within the housing body. Blades of the central common terminal can also connect to a connector that can engage an external load that is not part of the bundled capacitor.

A plurality of auxiliary terminals can also be disposed on or through the cap. Each auxiliary terminal, or a wire engaged with each auxiliary terminal, can engage a frangible connection within the housing body. Each auxiliary terminal can be formed the same as the central common terminal in that it can have the same kind and size of blades. Blades of each auxiliary terminal can engage external loads.

The bundled capacitor can include an interrupter. In one or more embodiments, the interrupter can be secured to the cap on the side of the cap that is connected to the housing body. The interrupter can be made of an insulating material such as rubber, plastic, or an elastomeric insulating material.

The central common terminal and each of the auxiliary terminals can pass through the interrupter to engage the frangible connections. The interrupter can ensure good insulation and can improve safety, such as when overheating of the bundled capacitor occurs.

The interrupter can have a diameter that is slightly less than the diameter of the cap, and can have a thickness from about 0.002 millimeters to about 15 millimeters.

The terminals can be disposed through holes which can be disposed in the interrupter. The holes can be drilled into the interrupter and can be disposed from about 2 millimeters to about 10 millimeters apart. In one or more embodiments, the holes can be disposed in the interrupter in a concentric manner, and an additional hole can be centrally disposed in the interrupter for the central common terminal.

The interrupter can have an inner part which can be made of plastic, Mylar™, or another material. The interrupter can have an outer part which can be made of an insulating material, a thermoplastic, Nylon™, or another material.

Each interrupter can have at least one spacer per terminal. The spacers can be donut shaped, shaped like two cones joined together, a frusto-conical shape, or another shape. The spacers can have a thickness from about 0.1 millimeter to about 22 millimeters, a length of from about 1.5 millimeters to about 30 millimeters, and a width of from about 1.65 millimeters and to about 25.7 millimeters.

The spacers can be perforated, laminated, reinforced, or combinations thereof. A fastener can be used to connect the spacers, such as a rivet.

An insulating spider can be secured to the cap opposite the housing body.

The spider can include a tubular section that can have a central annulus. The spider can also include a plurality of legs that project from the tubular section. The plurality of legs can be disposed about the entire circumference of the tubular section. Embodiments can include three or more legs.

The legs of the spider can provide separation between adjacent auxiliary terminals, while the tubular section of the spider can provide separation between each auxiliary terminal and the central common terminal. The central common terminal can be disposed within the central annulus.

A plurality of individual rolled sandwich like connected capacitors can be disposed within the bundled capacitor housing.

In one or more embodiments, the bundled capacitor can include at least three and up to 50 capacitors. Each capacitor can be a fully separate and fully functioning capacitor. When the capacitors are connected together, the capacitors can form the bundled capacitor with selective capacitance values.

Each individual capacitor can have an individual capacitance, such as from about 0.5 microfarads to about 100 microfarads. Each individual capacitor can have a different individual capacitance based upon the particular uses of the bundled capacitor. In one or more embodiments, more than one individual capacitor of a bundled capacitor can have the same capacitance.

Each individual capacitor can have a positive terminal and a negative terminal. The negative terminals of the plurality of capacitors can be electrically connected together, which forms an insulated collective connection. The insulated collective connection can be electrically connected to at least one thermal fuse, which can in-turn be electrically connected to the frangible connection in communication with the central common terminal.

In one or more embodiments, each negative terminal of a capacitor can be directly connected to an individual thermal fuse, and a single connection from the fuse can connect to the frangible connection in communication with the central common terminal.

Thermal fuses usable herein can include those made by NEC, such as NEC model number 105-72500-1.

The thermal fuses can provide the benefit of greater safety for a user of the bundled capacitor. In one or more embodiments, the use of thermal fuses can provide an instantaneous solution to overheating of an individual capacitor. Two or more thermal fuses can be connected together in parallel to provide the benefit of being able to maintain the rest of the individual capacitors when one of the individual capacitors fails to function.

All of the thermal fuses can be disposed between the collective connection and the central common terminal.

The interior of the housing body and the cap can include an insulating layer. The insulating layer can encapsulate any metal portions or conductive portions of the interior of the housing body, which provides for safety and for a lower likelihood of the bundled capacitor to short out. The insulating layer can provide a form of cathodic protection for the bundled capacitor. The insulating layer can enable the bundled capacitor to function at a cooler temperature, which produces less heat. Therefore, the bundled capacitor can be more reliable than other capacitors by at least about 15 percent.

The insulating layer can be made from a flame retardant material such as a coated webbed material or a plasticized non-woven paper and can have a thickness from about 0.002 to about 0.7 millimeters.

In one or more embodiments, the insulating layer can cover only about ¾ of the interior of the housing, which saves money.

The insulating layer can be applied by sputtering, microdeposition, hand laying, by dipping of the housing into a bath of the insulating layer material, or by another means.

When the individual capacitors are disposed within the housing, a resin can disposed around the individual capacitors. The resin can secure the individual capacitors to the first integral end, to the insulating layer, and can cover the individual capacitors of the bundled capacitor.

In one or more embodiments, the resin does not completely fill the housing body, which allows for space for the bundled capacitor to have an expansion chamber.

The resin can be a blend of resins that have different physical properties. For example, a resin, such as polyurethane can have anti-static properties and can be blended with a dried insulating gas that can have impact resistance properties. The blended resins can be blended in various ratios, such as 8 to 1.

The resin can be made of 100 percent epoxy resin. In one or more embodiments, the resin can be a fast curing resin, such as an advanced epoxy resin insulating material which can provide an unexpected benefit of being more lightweight than other types of fluid-filled or oil-filled capacitors. For example, the resin can be Axson RE 22801/RE 2120. In one or more embodiments, the resin can be an insulating and flame retarding resin.

Use of the resin can prevent the environmental damage that can be caused by oil leaks, such as when an internal component explodes or when a component not related to the bundled capacitor punctures the housing, such as a forklift prong.

The insulating layer can be disposed over the resin that can be used to fill the housing, which provides an encapsulated version of the capacitors of the bundled capacitor.

The resin can rigidly support and connect the plurality of individual rolled sandwich like connected capacitors to the first integral end and to the insulating layer. In one or more embodiments, the resin can connect the plurality of individual rolled sandwich like connected capacitors to at least 80 percent of the insulating layer.

In one or more embodiments, an insulating oil can be used in place of the resin.

An expansion chamber can be formed in the housing body and can be disposed between the resin and the interrupter, which enables the cap to have a space for heated air to expand within. The expansion chamber can provide a space for heated air to expand, which allows the cap to deform when one or more of the individual capacitors overheats, providing a fail safe feature. The expansion chamber can allow the cap to deform without disengaging the cap from the housing body.

An adhesive, such as a silicon based adhesive from 3M of the United States, can be disposed between the cap and the housing body. The adhesive can be applied in a layer from about 0.0001 millimeters to about 1.0 millimeters.

Figure 1:
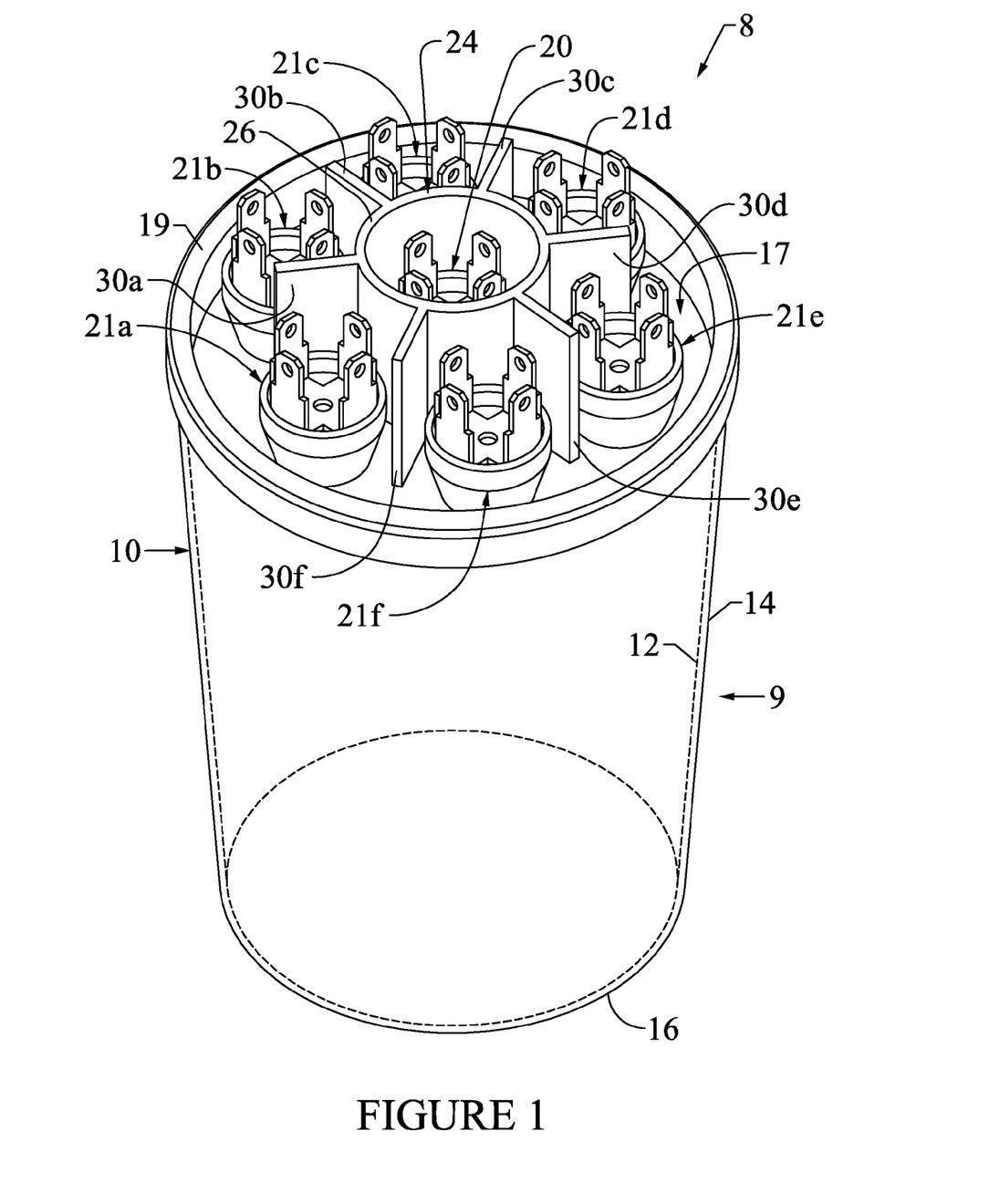
FIG. 1 is a view of a bundled capacitor.

Turning now to the Figures, FIG. 1 shows a bundled capacitor 8 with a housing 9 with an open top. The housing 9 is shown with a housing body 10 and a first integral end 16, which can be connected to walls of the housing body 10. The housing 9 is shown having an interior side 12 and an exterior side 14.

A cap 17 can be connected to the open top of the housing 9. A central common terminal 20 can be disposed in the center of the cap 17. The cap 17 can also include a lip 19, which can engage the edges of the open top of the housing 9.

A plurality of auxiliary terminals can be concentrically disposed around the central common terminal 20. In the embodiment depicted, six auxiliary terminals are shown as auxiliary terminals 21a, 21b, 21c, 21d, 21e, and 21f.

The bundled capacitor 8 can include an insulating spider 24 having a tubular section 26 and legs 30a, 30b, 30c, 30d, 30e, and 30f.

The tubular section 26 can have a central annulus surrounding the central common terminal 20 and separating the auxiliary terminals from the central common terminal 20. The legs 30a, 30b, 30c, 30d, 30e, and 30f can extend from the tubular section 26 separating each auxiliary terminal from adjacent auxiliary terminals.

The legs 30a, 30b, 30c, 30d, 30e, and 30f can be made from a thermoplastic, such as a nylon blend available from I.E. DuPont of Wilmington, Del. The legs can have a thickness of about 0.25 millimeters.

The tubular section 26 can have a diameter of about 15 millimeters and each leg can be about 35 millimeters long. The insulating spider 24 can be made from an insulating material.

Figure 2:
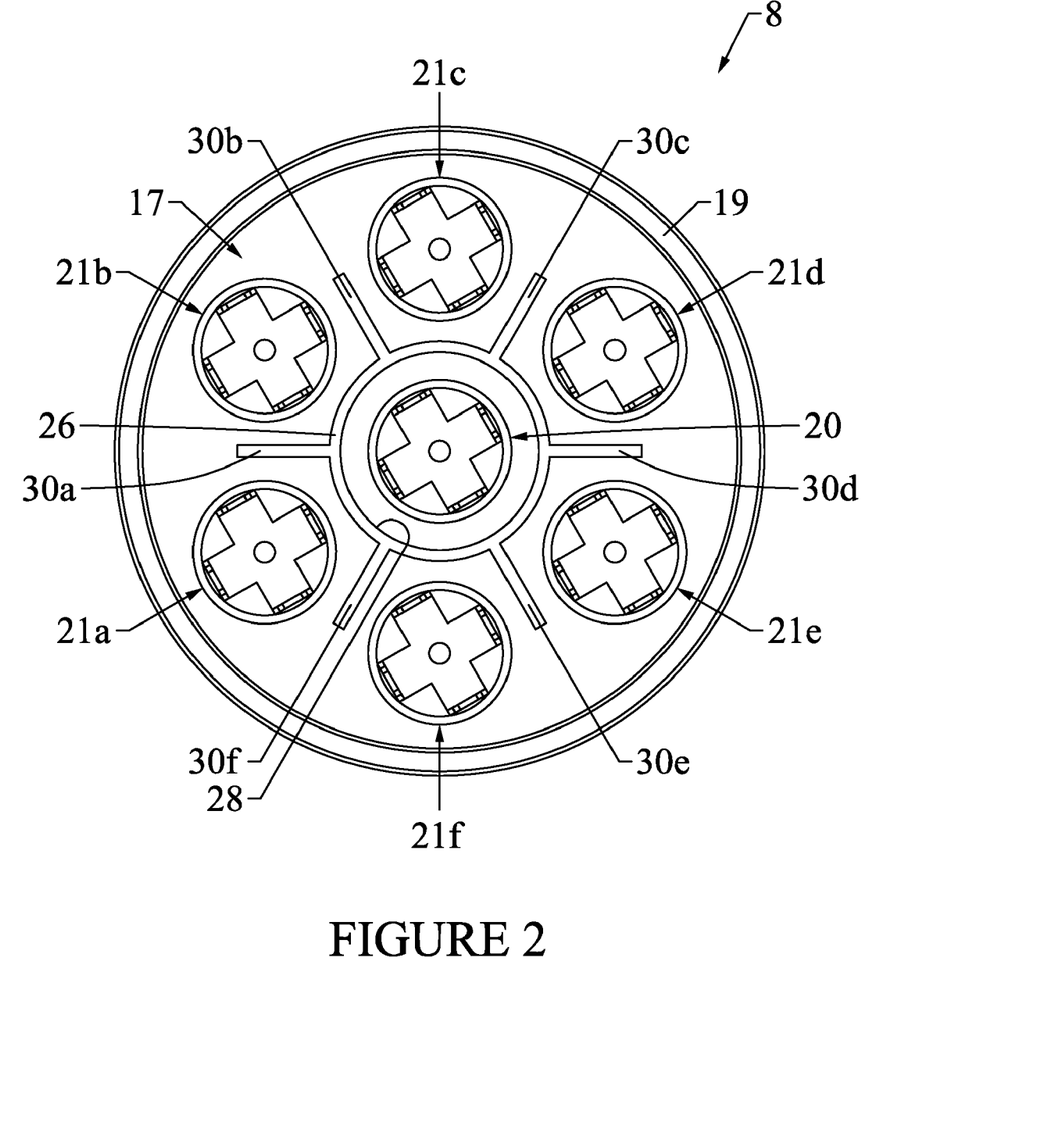
FIG. 2 is a top view of a bundled capacitor.

FIG. 2 is a top view of the bundled capacitor 8 with the cap 17, which can be connected to the housing on the opposite side of the housing body from the first integral end. The cap 17 is shown with the lip 19.

Each of the six auxiliary terminals 21a, 21b, 21c, 21d, 21e, and 21f are shown equally spaced around the cap 17 and separated by legs 30a, 30b, 30c, 30d, 30e, and 30f. The central common terminal 20 can be centrally disposed within a central annulus 28 of the tubular section 26 on the cap 17.

Figure 3A:
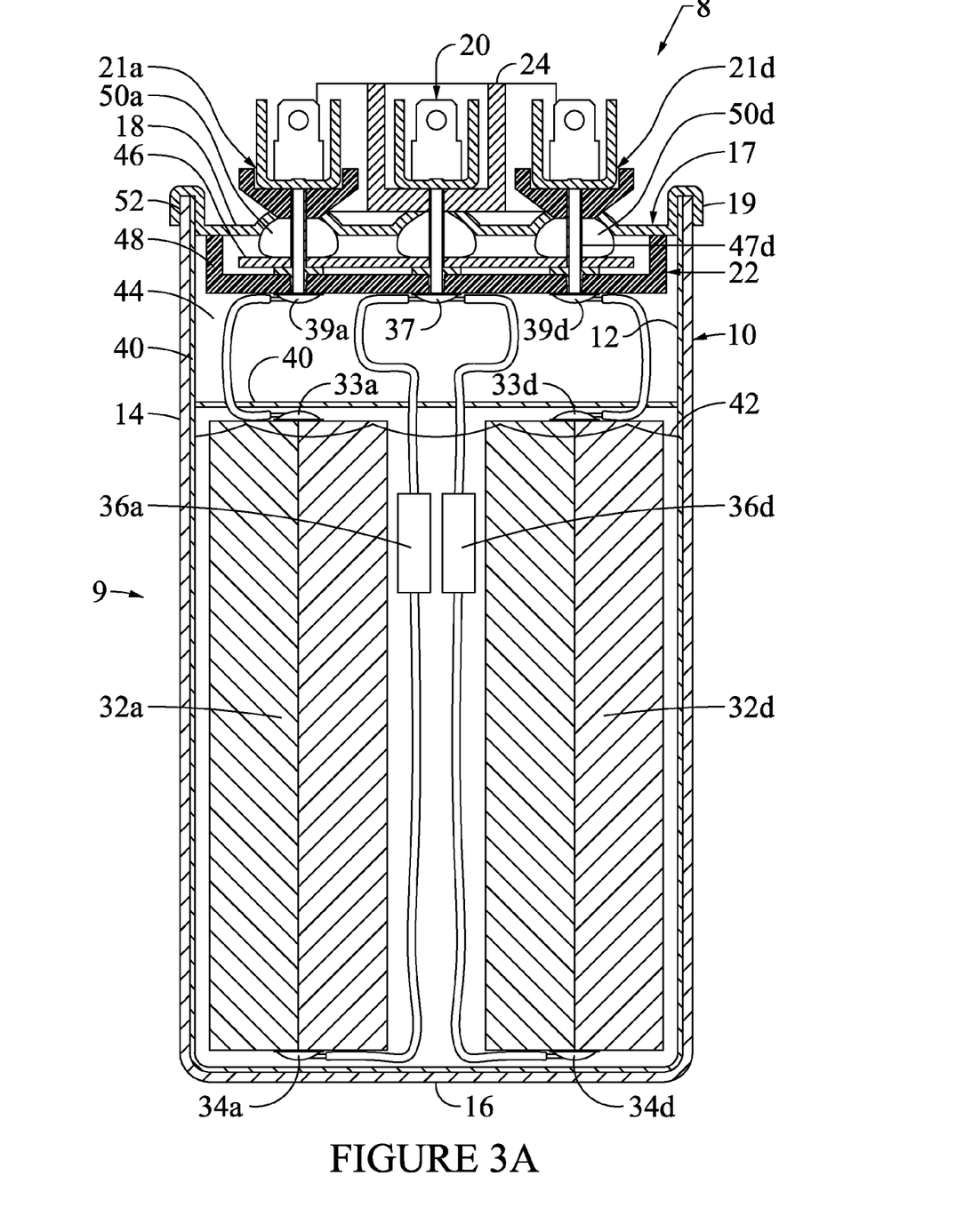
FIG. 3A is a cross sectional view of an embodiment of the bundled capacitor.

FIG. 3A shows a detailed cross section of the bundled capacitor 8 that has the housing 9 with an open top, the housing body 10, and the first integral end 16 connected to the walls of the housing body 10. The housing 9 can have an interior side 12 and an exterior side 14.

Auxiliary terminals 21a and 21d as well as the central common terminal 20 are shown separated by the insulating spider 24.

Two individual rolled sandwich like connected capacitors 32a and 32d are shown within the housing 9. Each individual rolled sandwich like connected capacitor 32a and 32d can have a positive terminal 33a and 33d and a negative terminal 34a and 34d opposite the positive terminal 33a and 33d.

Each of the negative terminals 34a and 34d can connect with a thermal fuse 36a and 36d.

The thermal fuses 36a and 36d can connect, such as by wiring, to a frangible electrical connection 37 that can be located on the bottom of an interrupter 22 between the thermal fuses 36a and 36d and the central common terminal 20. The frangible electrical connection 37 can connect to both thermal fuses 36a and 36d as well as the central common terminal 20.

The interrupter 22 can be disposed on the expandable body 18 of the cap 17 and can extend towards and/or within the housing body 10. The interrupter 22 can engage each of the auxiliary terminals and can include an inner part 46, an outer part 48, and at least one spacer 50a and 50d for each terminal. The spacers 50a and 50d can provide insulation between the cap 17 and the housing 9. The spacers 50a and 50d can be connected to the cap 17 with fasteners, such as rivets. Fastener 47d is shown. The fasteners can join and connect the auxiliary terminals 21a and 21d to the frangible electrical connections 39a and 39d, which prevents arcing and other safety hazards.

The inner part 46 and the outer part 48 of the interrupter 22 can be laminated together.

The bundled capacitor 8 can have an insulating layer 40 that can line the interior 12 of the housing 9 as well as the top and bottom of a resin 42. The resin 42 can encapsulate the individual capacitors of the bundled capacitor 8.

The resin 42 can be flowed around the capacitors 32a and 32d within the housing body 10, which seals the capacitors to the insulating layer 40 and to the first integral end 16. The resin 42 can connect the capacitors 32a and 32d to the first integral end and to at least about 80% of the insulating layer 40.

An expansion chamber 44 can be formed and disposed between the cap 17 and the individual capacitors 32a and 32d. The expansion chamber 44 can be formed between the resin 42 and the interrupter 22, which enables the cap 17 to deform when an individual capacitor overheats in the bundled capacitor 8. The thermal fuses 36a and 36d can be located within the resin 42 or can be located above the resin 42.

The cap 17 can have a lip 19 that can be crimped around an outside of the housing body 10. The expandable body 18 of the cap 17 can be integrally connected to the lip 19.

The bundled capacitor 8 can include an adhesive 52, which can be disposed between the cap 17 and the housing body 10 for providing a secure engagement between the cap and the housing body.

Figure 3B:
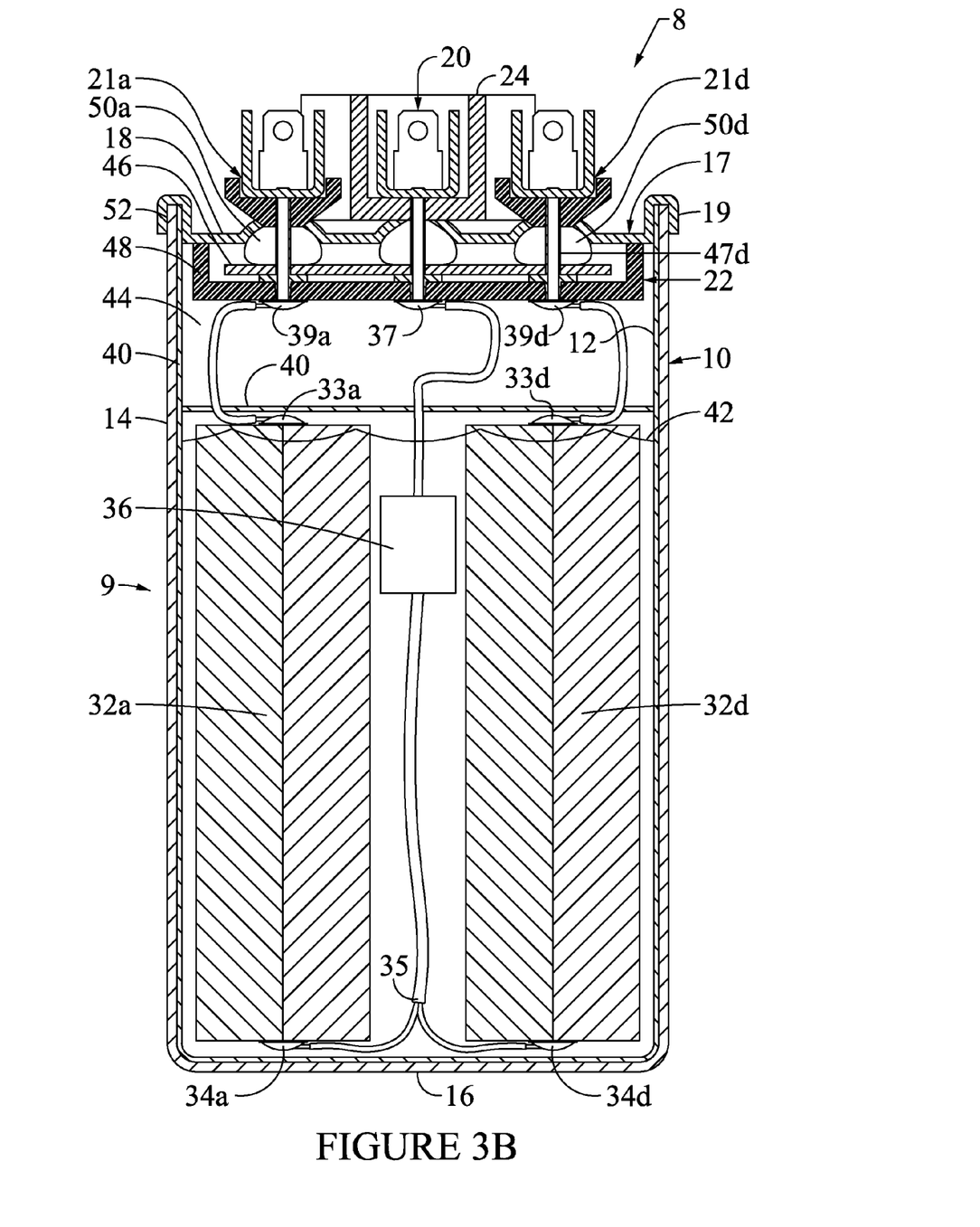
FIG. 3B is a cross sectional view of another embodiment of the bundled capacitor.

FIG. 3B shows another embodiment of the bundled capacitor 8.

Each of the negative terminals 34a and 34d can connect together to form an insulated collective connection 35 that can communicate with a single thermal fuse 36.

Also shown is the housing 9, the housing body 10, the first integral end 16, the interior side 12, the exterior side 14, the auxiliary terminals 21a and 21d, the central common terminal 20, the insulating spider 24, the capacitors 32a and 32d, the positive terminals 33a and 33d, the frangible electrical connection 37, the interrupter 22, the expandable body 18, the inner part 46, the outer part 48, the spacers 50a and 50d, the fastener 47d, the frangible electrical connections 39a and 39d, the insulating layer 40, the resin 42, the expansion chamber 44, the cap 17, the lip 19, and the adhesive 52.

Figure 4:
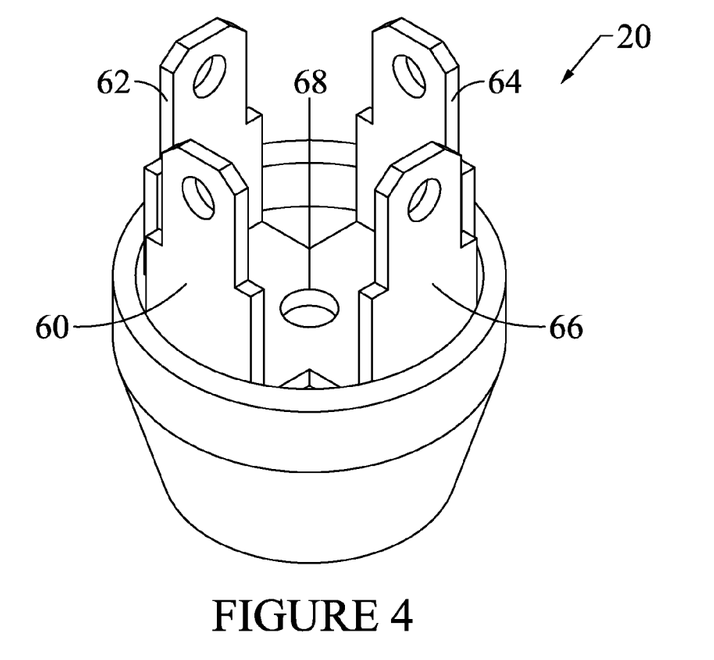
FIG. 4 is a detail of a central common terminal and a cap.

FIG. 4 shows a detail of the central common terminal 20. The central common terminal can have four blades 60, 62, 64, and 66, as well as a rivet hole 68. The fastener can engage the rivet hole.

Figure 5:
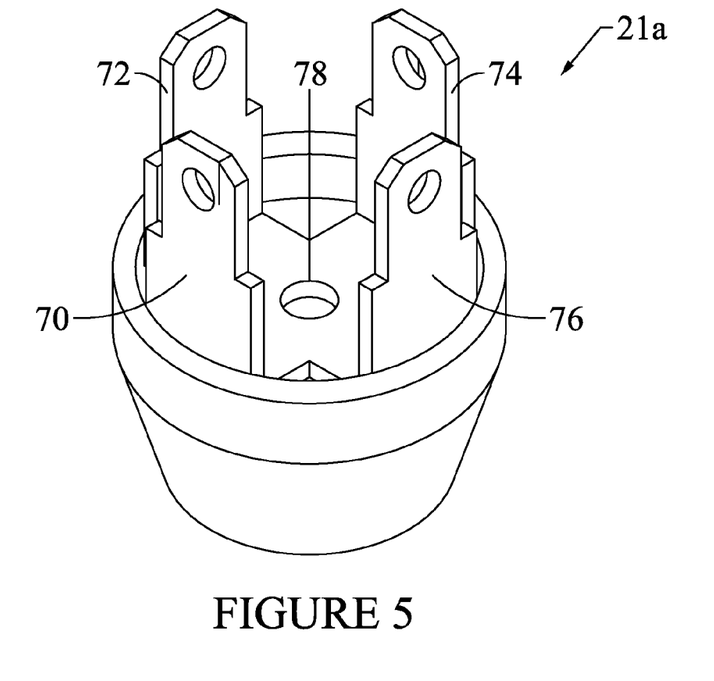
FIG. 5 is a detail of an auxiliary terminal.

FIG. 5 shows a detail of one of the auxiliary terminals 21a. This auxiliary terminal can have four blades 70, 72, 74, and 76, as well as a rivet hole 78, which can be engaged by a fastener.

The blades of the auxiliary terminals or central common terminals can provide an electrical connection between the bundled capacitor and a motor, such as a single phase motor similar to one used in an air conditioning unit.

Uniquely, one or more embodiments can allow connection of the bundled capacitor to multiple single phase motors simultaneously, which saves time and money in comparison to using multiple individual capacitors. The bundled capacitor can thereby provide multiple and variable capacitance. The auxiliary terminals can allow the individual capacitors to connect together, such as in series, which allows a user to select individual capacitances.

Figure 6:
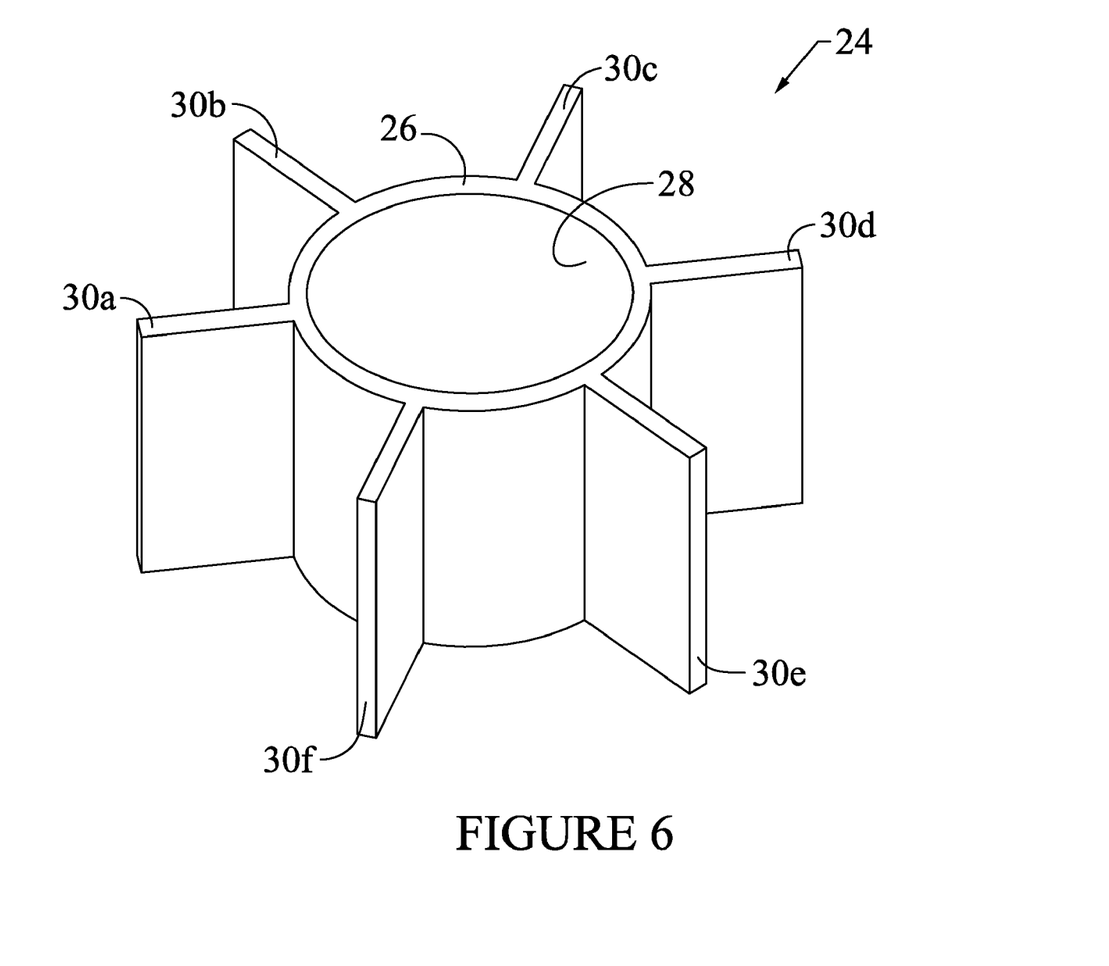
FIG. 6 shows an insulating spider.

FIG. 6 shows the insulating spider 24 having six legs 30a, 30b, 30c, 30d, 30e, and 30f. The insulating spider 24 is also shown having a central tubular section 26 with a central annulus 28. In one or more embodiments, the insulating spider 24 can include from one leg to eight legs. The insulating spider can also have more than eight legs.

Figure 7:
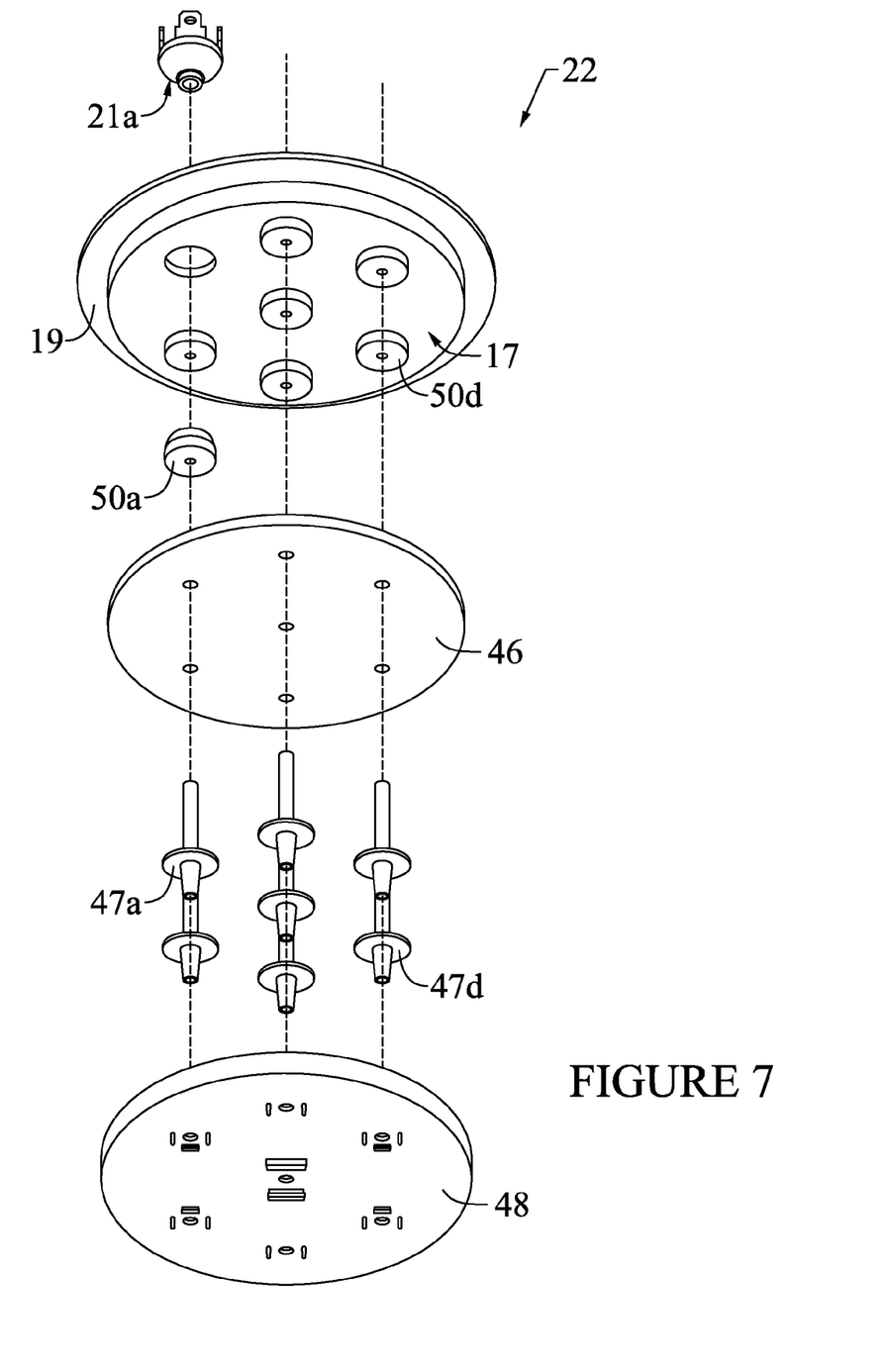
FIG. 7 is a detailed view of an interrupter.

FIG. 7 shows an exploded view of the interrupter 22 that has an inner part 46, an outer part 48, and spacers 50a and 50d. The spacers 50a and 50d can provide for spacing the inner part 46 from the cap 17.

The lip 19 is depicted disposed on the outer circumference of the cap 17.

Auxiliary terminal 21a is also shown. Fasteners 47a and 47d can connect through the inner part 46, each of the spacers 50a and 50d, the cap 17, and the outer part 48, which provides a fastening engagement. The fasteners can be rivets or bolts.

Figure 8:
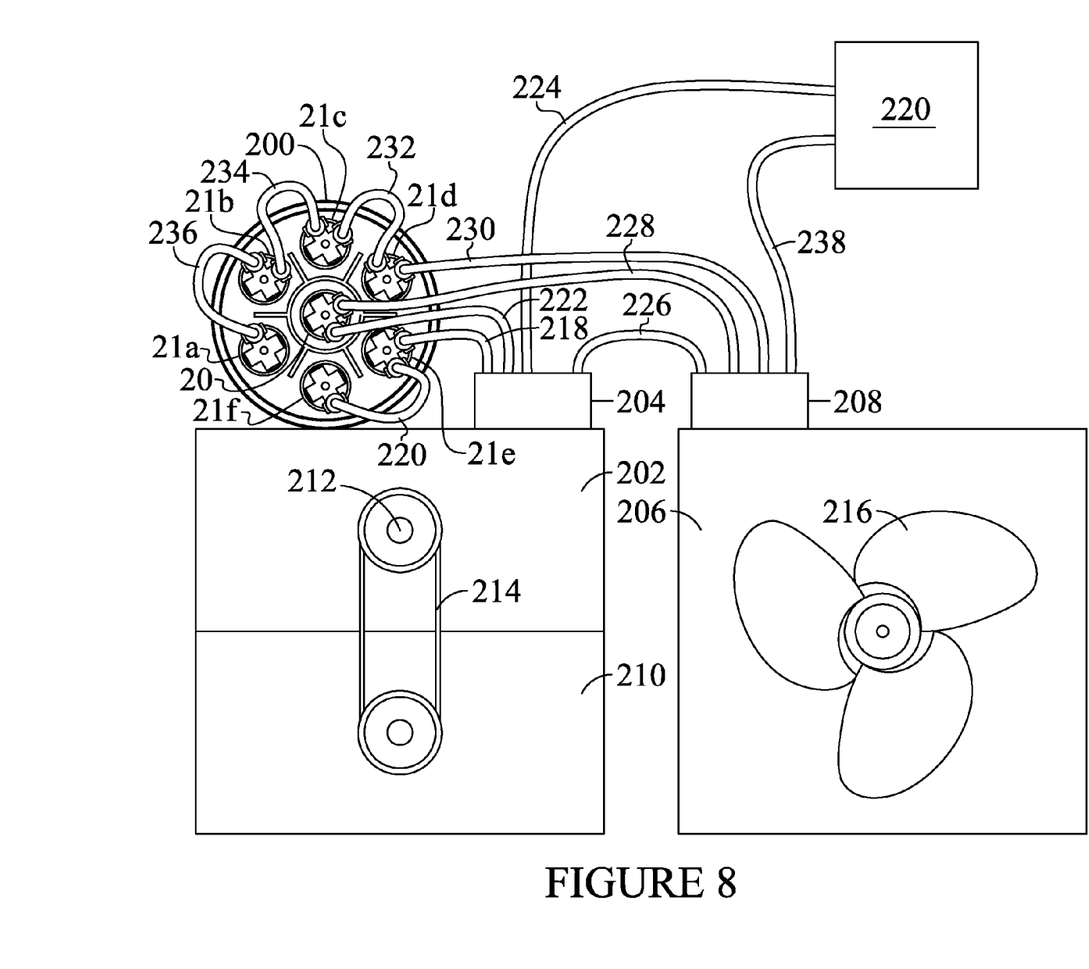
FIG. 8 is a schematic view of a bundled capacitor connected in parallel to at least two single phase motors.

FIG. 8 illustrates the bundled capacitor 200 connected to two motors in parallel for providing selective capacitance to at least two single phase motors simultaneously, such as for an air conditioning application.

The bundled capacitor 200 can be connected to a first motor 202 through a first connector block 204. A first wire 218 can connect the first connector block 204 to auxiliary terminal 21e. A second wire 220 can connect between auxiliary terminal 21e and auxiliary terminal 21f such that the auxiliary terminals 21e and 21f are connected in series. A third wire 222 can connect between the first connector block 204 and the central common terminal 20. A fourth wire 224 can connect between the first connector block 204 and a power supply 220.

The first motor 202 can be in communication with a compressor 210 through a pulley 212 and a belt 214.

The bundled capacitor 200 can also be connected to a second motor 206 through a second connector block 208. The second motor 206 can be a motor for circulating a box fan 216.

A fifth wire 226 can connect between the first connector block 204 and the second connector block 208.

A sixth wire 228 can connect between the second connector block 208 and the central common terminal 20. A seventh wire 230 can connect between the second connector block 208 and auxiliary terminal 21d.

An eighth wire 232, a ninth wire 234, and a tenth wire 236 can connect between auxiliary terminals 21d, 21c, 21b, and 21a such that the auxiliary terminals are connected in series. An eleventh wire 238 can connect between the second connector block 208 and the power supply 220.

In the embodiment shown, the bundled capacitor 200 is illustrated connected to two motors. However, the bundle capacitor can be connected to more or less than two motors. The bundled capacitor can be connected to various types of single phase motors such as air conditioning unit motors, garage door motors, vacuum cleaner motors, or other single phase motors.

Figure 9A:
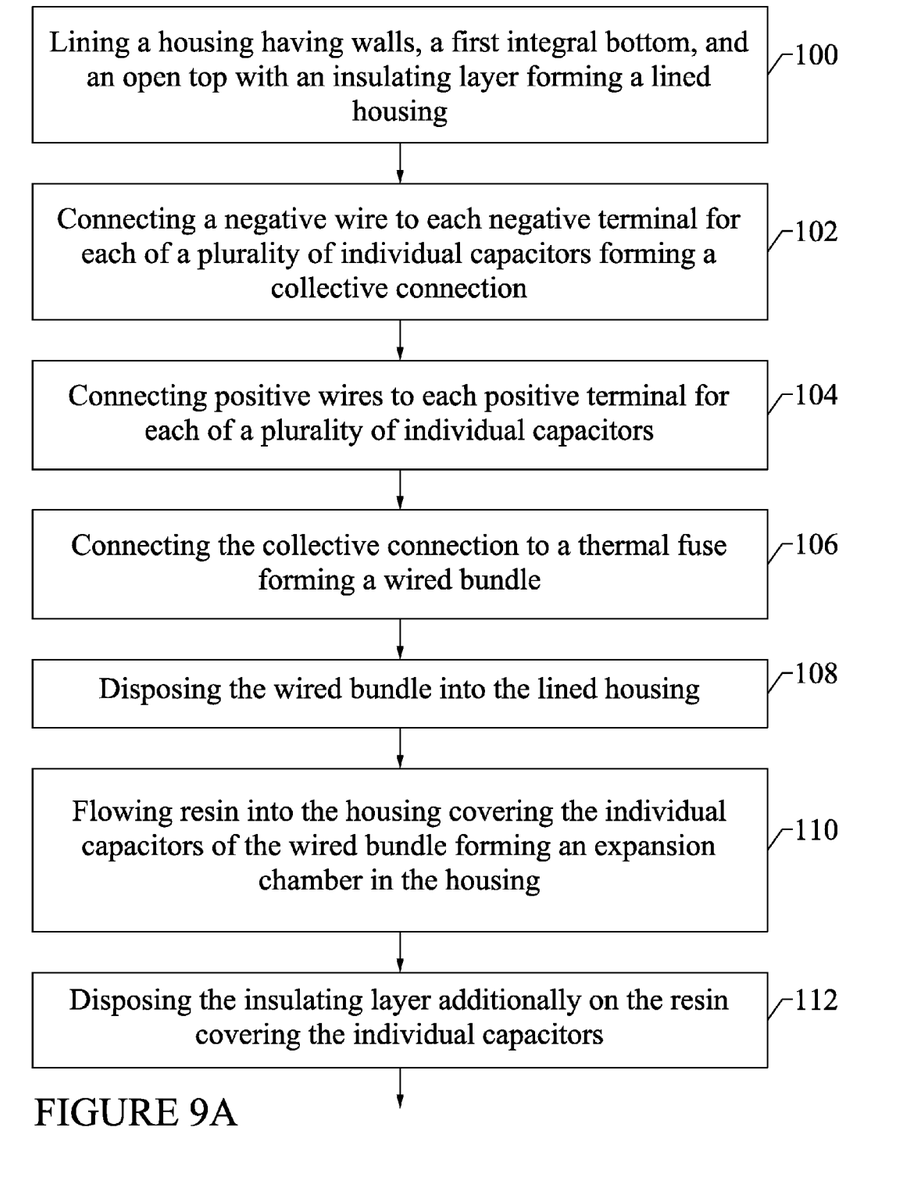
FIG. 9A depicts a flow chart of an embodiment of steps for generating multiple capacitance values.
Figure 9B:
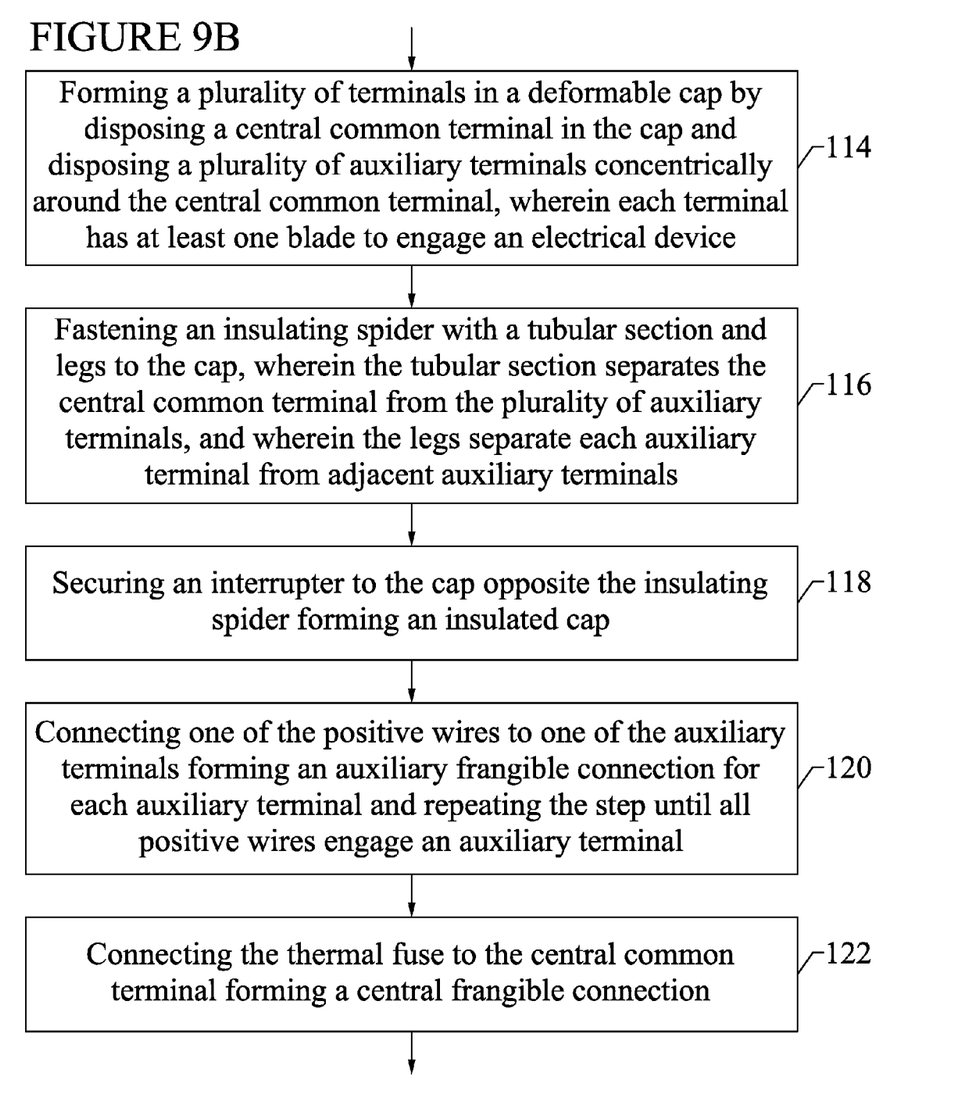
FIG. 9B depicts a continuation of the flow chart of FIG. 9A.
Figure 9C:
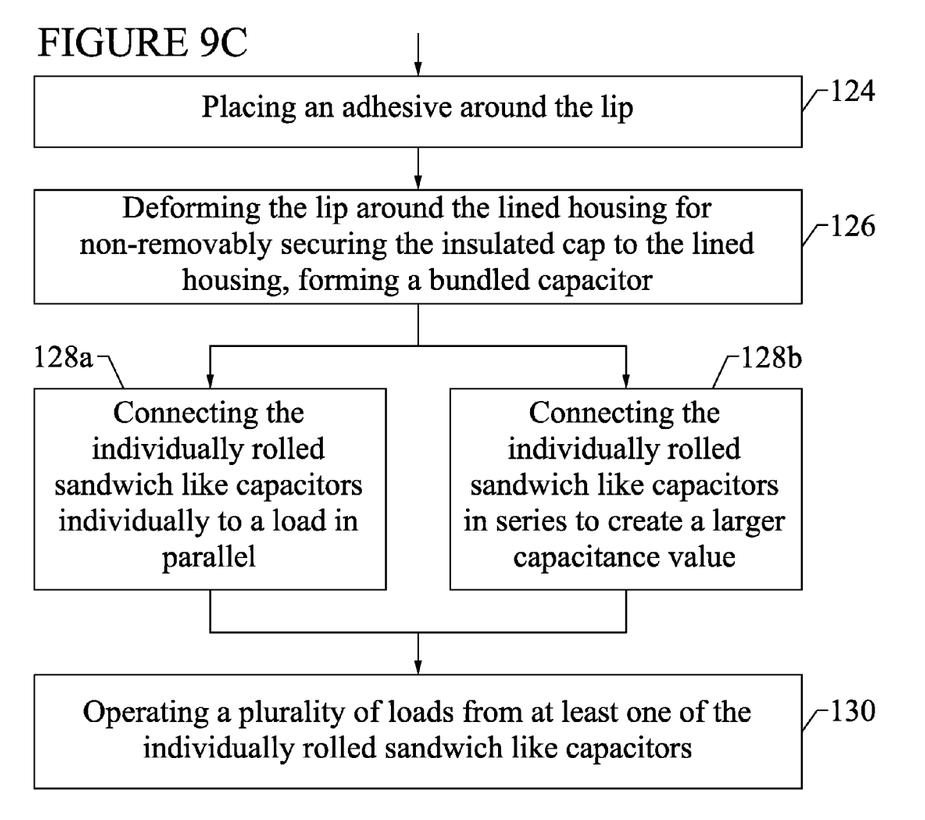
FIG. 9C depicts a continuation of the flow chart of FIG. 9B.

FIGS. 9A-9C depict an embodiment of the method.

FIG. 9A shows a first step 100 that can include lining a housing having walls, a first integral bottom, and an open top with an insulating layer forming a lined housing.

A step 102 can include connecting a negative wire to each negative terminal for each of a plurality of individual capacitors forming a collective connection.

A step 104 can include connecting positive wires to each positive terminal for each of a plurality of individual capacitors.

A step 106 can include connecting the collective connection to a thermal fuse forming a wired bundle.

A step 108 can include disposing the wired bundle into the lined housing.

A step 110 can include flowing resin into the housing covering the individual capacitors of the wired bundle forming an expansion chamber in the housing.

A step 112 can include disposing the insulating layer additionally on the resin covering the individual capacitors.

FIG. 9B shows a continuation of the flow chart shown in FIG. 9A.

A step 114 can include forming a plurality of terminals in a deformable cap by disposing a central common terminal in the cap and disposing a plurality of auxiliary terminals concentrically around the central common terminal, wherein each terminal has at least one blade to engage an electrical device.

A step 116 can include fastening an insulating spider with a tubular section and legs to the cap, wherein the tubular section separates the central common terminal from the plurality of auxiliary terminals, and wherein the legs separate each auxiliary terminal from adjacent auxiliary terminals.

A step 118 can include securing an interrupter to the cap opposite the insulating spider forming an insulated cap.

A step 120 can include connecting one of the positive wires to one of the auxiliary terminals forming an auxiliary frangible connection for each auxiliary terminal and repeating the step until all positive wires engage an auxiliary terminal.

A step 122 can include connecting the thermal fuse to the central common terminal forming a central frangible connection.

FIG. 9C shows a continuation of the flow chart shown in FIG. 9B.

A step 124 can include placing an adhesive around the lip.

A step 126 can include deforming the lip around the lined housing for non-removably securing the insulated cap to the lined housing, forming a bundled capacitor.

A step 128a can include connecting the individually rolled sandwich like capacitors individually to a load in parallel.

A step 128b can include connecting the individually rolled sandwich like capacitors in series to create a larger capacitance value.

A step 130 can include operating a plurality of loads from at least one of the individually rolled sandwich like capacitors.

While these embodiments have been described with emphasis on the embodiments, it should be understood that within the scope of the appended claims, the embodiments might be practiced other than as specifically described herein.

What is claimed is:

1. A system for providing selective capacitance with a bundled capacitor, the system comprising:
   a. a bundled capacitor comprising:
      (i) a housing comprising:
         1. a body with an interior and an exterior;
         2. a first integral end connected to the body; and
         3. a hermetically sealable deformable cap connected to the body opposite the first integral end, wherein the cap comprises an expandable body and a lip integral with the expandable body for non-removable engagement with the body;
      (ii) a central common terminal disposed through the cap;
      (iii) a plurality of auxiliary terminals concentrically disposed around the central common terminal;
      (iv) an interrupter disposed on the expandable body and extending toward the body of the housing, wherein the interrupter engages each of the auxiliary terminals and the central common terminal;
      (v) an insulating spider disposed on the cap comprising:
         1. a tubular section with a central annulus for containing the central common terminal; and
         2. at least three legs extending from the tubular section for separating the plurality of auxiliary terminals;
      (vi) a plurality of individual rolled sandwich like connected capacitors disposed within the housing, wherein each individual rolled sandwich like connected capacitor comprises:
         1. an individual capacitance value;
         2. a positive terminal in electrical communication with one of the plurality of auxiliary terminals; and
         3. a negative terminal, wherein the negative terminals are electrically connected together to form an insulated collective connection;
      (vii) at least one thermal fuse disposed within the housing, wherein the at least one thermal fuse is in electrical communication with the insulated collective connection and with the central common terminal;
      (viii) an insulating layer substantially disposed on the interior of the body;
      (ix) an insulating and flame retarding curing resin disposed around the plurality of individual rolled sandwich like connected capacitors for rigidly supporting and connecting the plurality of individual rolled sandwich like connected capacitors to the first integral end and at least partially to the insulating layer; and
      (x) an expansion chamber formed between the insulating and flame retardant curing resin and the interrupter, wherein the expansion chamber enables the cap to deform when at least one of the individual rolled sandwich like connected capacitors overheats in the bundled capacitor; and
   b. at least one motor in electrical communication with the bundled capacitor.

2. The system of claim 1, wherein the at least one motor is an air conditioning unit motor, a garage door motor, a vacuum cleaner motor, a box fan motor, or another single phase motor.

3. The system of claim 1, wherein the bundled capacitor is in electrical communication with at least two motors.

4. The system of claim 1 further comprising a power supply in communication with the at least one motor.

5. The system of claim 1, wherein the motor is in electrical communication with the central common terminal and at least one of the plurality of auxiliary terminals.

6. The system of claim 5, wherein at least one of the plurality of auxiliary terminals is in electrical communication with another of the plurality of auxiliary terminals in series.

7. The system of claim 1, wherein the interrupter comprises:
   a. an inner part;
   b. an outer part; and
   c. at least one spacer per terminal.

8. The system of claim 1, wherein each individual rolled sandwich like connected capacitor has a different selective capacitance value.

9. The system of claim 1, wherein at least two of the plurality of individual rolled sandwich like connected capacitors have identical selective capacitance values.

10. A system for providing selective capacitance with a bundled capacitor, the system comprising:
   a. a bundled capacitor comprising:
      (i) a housing comprising a housing body, an end, and an open top;
      (ii) a cap comprising a cap body and a lip, wherein the cap is connectable to the open top;
      (iii) a central common terminal disposed through the cap;
      (iv) a plurality of auxiliary terminals disposed through the cap;
      (v) an interrupter disposed on the cap and engaging each of the auxiliary terminals and the central common terminal;

(vi) an insulating spider disposed on the cap comprising a tubular section and at least one leg extending from the tubular section for separating the terminals;
(vii) a plurality of individual capacitors disposed within the housing, wherein each individual capacitor comprises:
1. a positive terminal in electrical communication with one of the plurality of auxiliary terminals; and
2. a negative terminal in electrical communication with at least one thermal fuse disposed within the housing, and wherein the at least one thermal fuse is in electrical communication with the central common terminal;
(viii) an insulating layer substantially disposed on the interior of the housing body;
(ix) a resin disposed around the plurality of individual capacitors; and
(x) an expansion chamber formed between the resin and the interrupter, wherein the expansion chamber enables the cap to deform when at least one of the individual capacitors overheats in the bundled capacitor; and
b. at least one motor in electrical communication with the bundled capacitor.

11. The system of claim 10, wherein the cap body is an expandable cap body.

12. The system of claim 10, wherein each individual capacitor has a different selective capacitance value.

13. The system of claim 10, wherein at least two of the plurality of individual capacitors have identical selective capacitance values.

14. The system of claim 10, wherein each negative terminal is in electrical communication with a thermal fuse in parallel.

15. A system for providing selective capacitance with a bundled capacitor, the system comprising:
a. a bundled capacitor comprising:
(i) a housing comprising an open top;
(ii) a cap comprising an expandable cap body, wherein the cap is connectable to the open top;
(iii) a central common terminal disposed through the cap;
(iv) a plurality of auxiliary terminals disposed through the cap; and
(v) a plurality of individual capacitors disposed within the housing, wherein each individual capacitor comprises:
1. a positive terminal in electrical communication with one of the plurality of auxiliary terminals; and
2. a negative terminal in electrical communication with at least one thermal fuse disposed within the housing, and wherein the at least one thermal fuse is in electrical communication with the central common terminal; and
b. a motor in electrical communication with the bundled capacitor.

16. The system of claim 15, wherein the motor is in electrical communication with the central common terminal and at least one of the plurality of auxiliary terminals.

17. The system of claim 16, wherein the at least one of the plurality of auxiliary terminals is in electrical communication with another of the plurality of auxiliary terminals in series.

18. The system of claim 15 further comprising a resin disposed around the plurality of individual capacitors or an insulating oil disposed around the plurality of individual capacitors.

19. The system of claim 18 further comprising an expansion chamber formed between the resin and the interrupter, wherein the expansion chamber enables the cap to deform when at least one of the individual capacitors overheats in the bundled capacitor.

20. The system of claim 15, wherein each individual capacitor has a different selective capacitance value.

* * * * *